(12) United States Patent
Heuck et al.

(10) Patent No.: US 11,556,046 B2
(45) Date of Patent: Jan. 17, 2023

(54) EFFICIENT, HIGH-SPEED TWO-PHOTON LOGIC GATES AT ROOM TEMPERATURE FOR GENERAL-PURPOSE QUANTUM INFORMATION PROCESSING

(71) Applicant: Massacusetts Institute of Technology, Cambridge, MA (US)

(72) Inventors: Mikkel Heuck, Boston, MA (US); Dirk Robert Englund, Brookline, MA (US); Kurt Jacobs, Columbia, MD (US)

(73) Assignees: Massachusetts Institute of Technology, Cambridge, MA (US); THE USA AS REPRESENTED BY THE SEC. OF THE ARMY, Washington, DC (US)

( * ) Notice: Subject to any disclaimer, the term of this patent is extended or adjusted under 35 U.S.C. 154(b) by 309 days.

(21) Appl. No.: 16/807,662

(22) Filed: Mar. 3, 2020

(65) Prior Publication Data
US 2020/0348579 A1 Nov. 5, 2020

Related U.S. Application Data

(60) Provisional application No. 62/842,758, filed on May 3, 2019.

(51) Int. Cl.
*G02F 3/00* (2006.01)
*G06N 10/00* (2022.01)

(52) U.S. Cl.
CPC .............. *G02F 3/00* (2013.01); *G06N 10/00* (2019.01)

(58) Field of Classification Search
None
See application file for complete search history.

(56) References Cited

U.S. PATENT DOCUMENTS

| | | |
|---|---|---|
| 6,678,450 B1 | 1/2004 | Franson |
| 8,294,967 B2 | 10/2012 | Langford et al. |
| 9,052,448 B2 | 6/2015 | Hafezi et al. |

(Continued)

OTHER PUBLICATIONS

International Search Report and Written Opinion in International Application No. PCT/US2020/020786 dated Jul. 16, 2020, 10 pages.

(Continued)

*Primary Examiner* — Derek S. Chapel
(74) *Attorney, Agent, or Firm* — Smith Baluch LLP

(57) ABSTRACT

A two-photon logic gate introduces a phase shift between two photons using a Q-switched cavity with some nonlinearity. The two-photon logic gate catches photons in and releases photons from de-coupled cavity modes in response to electronic or photonic control signals. This "catch-and-release" two-photon gate can be formed in semiconductor photonic integrated circuit (PIC) that operates at room temperature. When combined with sources, linear circuits, other logic gates, and detectors, it can be used to make a quantum computer with up to 1000 error-corrected logical qubits on a $cm^2$ PIC, with full qubit connectivity to avoid overhead. Two-qubit gate fidelity exceeding 99% is possible with near-term technology, and scaling beyond 99.9% is possible. Two-photon logic gates are also suitable for gate-based quantum digital computing and for analog quantum computing schemes, such as adiabatic quantum computing or quantum annealing.

22 Claims, 11 Drawing Sheets

(56) References Cited

U.S. PATENT DOCUMENTS 9,235,101 B2* 1/2016 Silverstone ............. G02F 1/225

OTHER PUBLICATIONS

Biberman et al., "Ultralow-loss silicon ring resonators." Optics Letters 37.20 (2012): 4236-4238.
Brod et al., "Passive CPHASE gate via cross-Kerr nonlinearities." Physical Review Letters 117.8 (2016): 080502. 6 pages.
Chuang et al., "Simple quantum computer." Physical Review A 52.5 (1995): 3489-3496.
Clements et al., "Optimal design for universal multiport interferometers." Optica 3.12 (2016): 1460-1465.
Gea-Banacloche, "Impossibility of large phase shifts via the giant Kerr effect with single-photon wave packets." Physical Review A 81.4 (2010): 043823. 8 pages.
Giovannetti et al., "Quantum-enhanced measurements: beating the standard quantum limit." Science 306.5700 (2004): 1330-1336.
Harris et al., "Quantum transport simulations in a programmable nanophotonic processor." Nature Photonics11.7 (2017): 447. 7 pages.
Heuck et al., "Unidirectional frequency conversion in microring resonators for on-chip frequency-multiplexed single-photon sources." New Journal of Physics (2019). 20 pages.
Hu et al., "Experimental realization of deep-subwavelength confinement in dielectric optical resonators." Science Advances 4.8 (2018): eaat2355, 7 pages.
Johne et al., "Proposal for a two-qubit quantum phase gate for quantum photonic integrated circuits," Physical Review A 86, 063815 (2012), 5 pages.
Knill et al., "A scheme for efficient quantum computation with linear optics." Nature 409.6816 (2001): 46-52.
Li et al., "Resource costs for fault-tolerant linear optical quantum computing." Physical Review X 5.4 (2015): 041007. 15 pages.
Li et al., "Efficient and low-noise single-photon-level frequency conversion interfaces using silicon nanophotonics." Nature Photonics 10.6 (2016): 406-414.
Michael et al., "New class of quantum error-correcting codes for a bosonic mode." Physical Review X 6.3 (2016): 031006. 26 pages.
Nielsen et al., "Quantum computation and quantum information." American Journal of Physics 70 (2002): 558-560. 4 pages.
Nysteen et al., "Limitations of two-level emitters as nonlinearities in two-photon controlled-phase gates." Physical Review A 95.6 (2017): 062304. 7 pages.
Reck et al., "Experimental realization of any discrete unitary operator." Physical Review Letters 73.1 (1994): 58-61.
Reddy et al., "Photonic temporal-mode multiplexing by quantum frequency conversion in a dichroic-finesse cavity." Optics Express 26.21 (2018): 28091-28103.
Shapiro, "Single-photon Kerr nonlinearities do not help quantum computation." Physical Review A 73.6 (2006): 062305. 11 pages.
Timurdogan et al., "Electric field-induced second-order nonlinear optical effects in silicon waveguides." Nature Photonics 11.3 (2017): 200. 8 pages.
Wang et al., "Integrated lithium niobate electro-optic modulators operating at CMOS-compatible voltages." Nature 562.7725 (2018): 101-104. 12 pages.
Xu et al., "Analytic properties of two-photon scattering matrix in integrated quantum systems determined by the cluster decomposition principle." Physical Review Letters 111.22 (2013): 223602. 5 pages.
Zhang et al., "Electronically programmable photonic molecule." Nature Photonics 13.1 (2019): 36-41.
Zhang et al., "Monolithic ultra-high-Q lithium niobate microring resonator." Optica 4.12 (2017): 1536-1537.

* cited by examiner

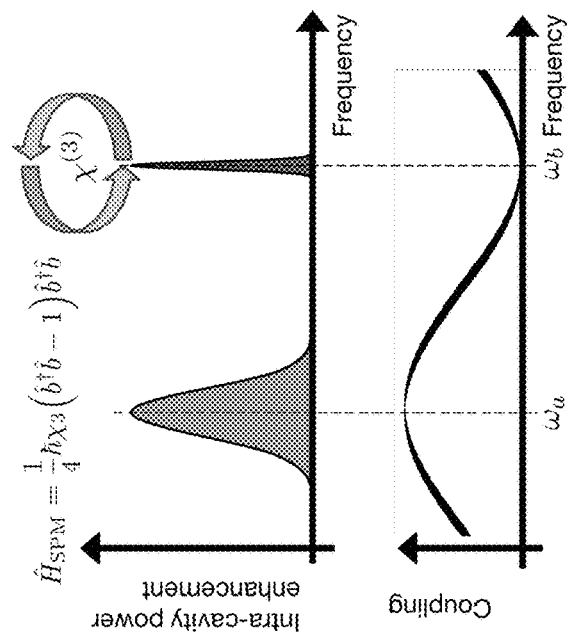
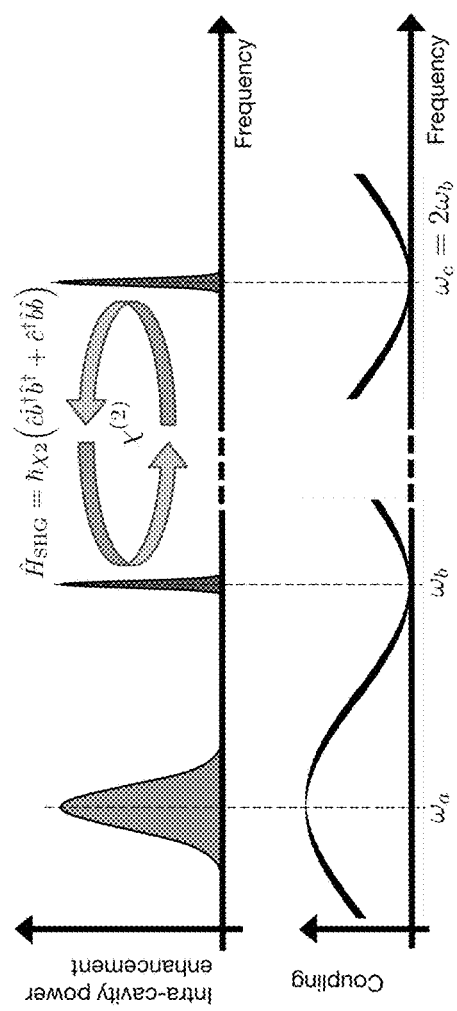
FIG. 3B
FIG. 3A

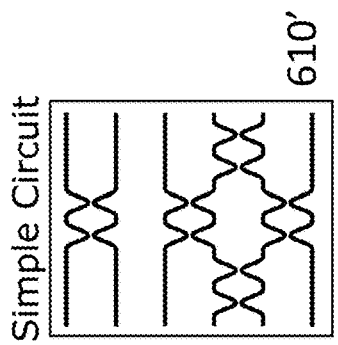
FIG. 6A
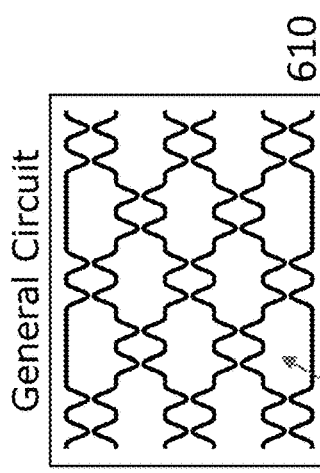
FIG. 6B
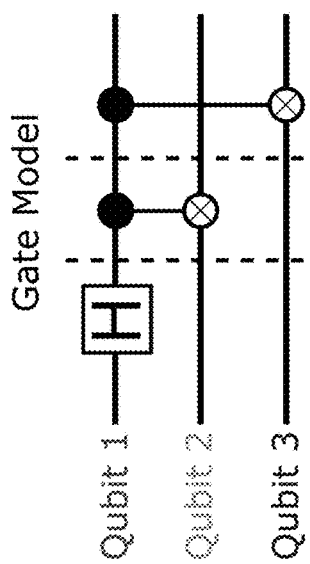
FIG. 6D
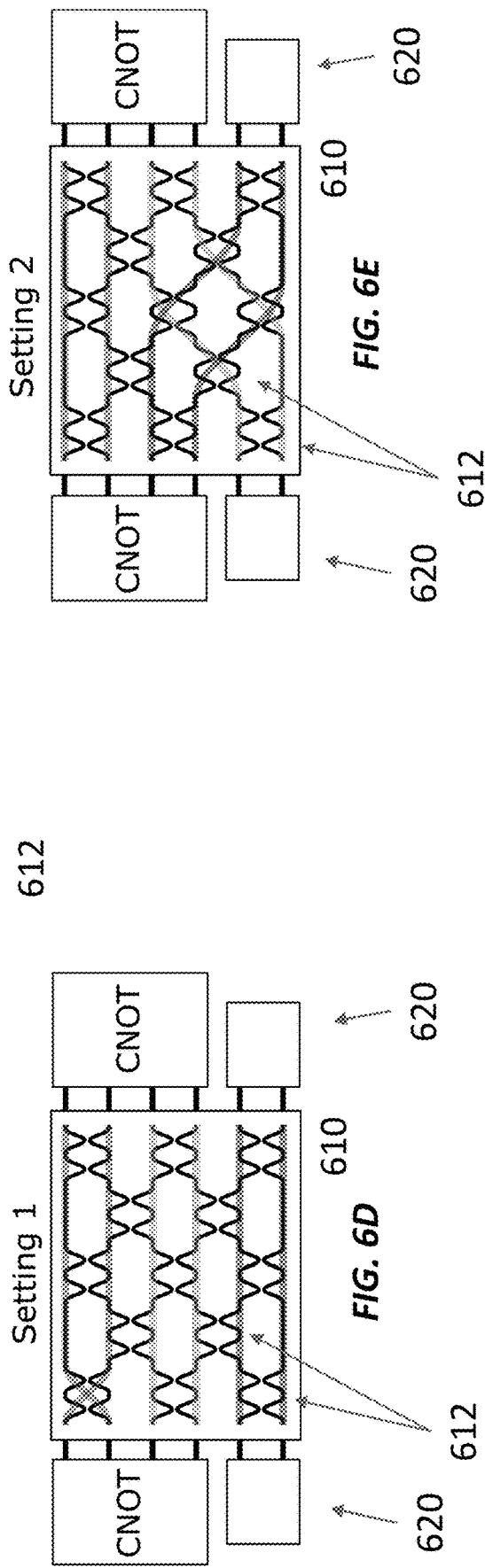
FIG. 6C
FIG. 6E

EFFICIENT, HIGH-SPEED TWO-PHOTON LOGIC GATES AT ROOM TEMPERATURE FOR GENERAL-PURPOSE QUANTUM INFORMATION PROCESSING

CROSS-REFERENCE TO RELATED APPLICATION(S)

This application claims the priority benefit, under 35 U.S.C. 119(e), of U.S. Application No. 62/842,758, filed on May 3, 2019, which is incorporated herein by reference in its entirety.

GOVERNMENT SUPPORT

This invention was made with Government support under Grant No. FA9550-16-1-0391 awarded by the Air Force Office of Scientific Research (AFOSR). The Government has certain rights in the invention.

BACKGROUND

A central challenge in quantum computing is the development of a universal set of one- and two-quantum-bit (qubit) logic gates, or simply gates. In photonic implementations of quantum information processing in which quantum information is stored in photons, high-performance one-qubit gates are easily realized, but two-qubit gates remain challenging. Measurement-based two-photon logic operations between two photons are possible, but at greatly added complexity, with many steps of teleportation and heralding. One-way quantum computing with photonic cluster states is another possibility, but this approach, too, entails orders of magnitude resource overhead.

A third class of gates depend on the nonlinearities of a material, such as the nonlinear susceptibility of a bulk dielectric or atom-like quantum system embedded inside a material. This approach has the appeal that it could directly implement logic gates between two photons with minimal overhead. However, the originally proposed scheme, which envisioned photon-photon interactions mediated by a Kerr medium, limits the gate fidelity to the point that it is not scalable. Subsequent work showed that high fidelities are in principle possible, but these schemes involve large numbers of devices and are extremely difficult to realize experimentally.

SUMMARY

Here, we introduce efficient photon-photon (i.e., two-photon) logic gates that are space efficient, fast, and can operate at room temperature. An example photon-photon logic gate captures control and target photons into a Q-switched photonic nanocavity with some nonlinearity (e.g., a $\chi^{(2)}$ or $\chi^{(3)}$ nonlinearity operating at room temperature or atomic-emitter-based nonlinearity at a temperature below room temperature). This "catch-and-release" two-photon gate is compatible with today's leading photonic integrated circuit technologies and could enable scalable quantum information processing devices at room temperature, including for scalable quantum computing, advanced quantum sensors, and one-way quantum repeaters.

An example two-photon gate includes a waveguide evanescently coupled to a resonator that supports up to three modes for the photons (also called "photon-modes") and up to three modes for optical control fields (also called "control-modes"). One of the three photon-modes is strongly coupled to the waveguide while the other photon-modes are de-coupled from the waveguide. The photon-modes are coupled to each other via a nonlinear interaction with strong classical control fields (electrical or optical). The control filed occupy the resonator's control-modes, which are strongly coupled to a waveguide to allow the classical control fields to enter and exit the resonator at short timescales. Electrical control fields can be delivered by electrodes rather than optical cavity modes.

By choosing the classical control fields appropriately, it is possible to transfer photon(s) from a photon wave packet traveling in the waveguide into one of the de-coupled photon-modes with high fidelity, and to do so for an incoming photon wave packet with essentially any temporal shape. The photon(s) in the photon wave packet can interact while occupying the de-coupled cavity modes, which ensures the absence of "many-to-many" mode-coupling that occurs while the photons are propagating as multimode photon wave packets in the waveguide. The photons can be emitted back into the waveguide using the control fields such that the photons reconstitute the same photon wave packet as when they first impinged on the resonator. In other words, this process preserves the amplitude and phase (temporal shape) of the photon wave packet.

Features of inventive two-photon gates include:
 The "catch-and-release" nonlinear cavity scheme enables efficient gates between two photonic qubits;
 Gate fidelity exceeding 99% is feasible with a realistic implementation;
 Gate durations on the nanosecond-scale are feasible with realistic technology;
 The scheme can be room-temperature compatible, facilitating control and integration with modern-day computing and control systems; and
 The nonlinearity can include $\chi^{(2)}$ effects, $\chi^{(3)}$ effects, or an atom-like quantum emitter in the cavity, such as atoms, color centers in diamond, or InGaAs quantum dots. The $\chi^{(2)}$ and $\chi^{(3)}$ effects enable room-temperature operation, and the quantum emitter operates at lower temperatures. Here, two-level emitters suffice to create high-fidelity gates. Gates based on two-level emitters can be more practical than gates based on three-level emitters.

An inventive two-photon gate can be used for general-purpose quantum computing, quantum networking, or quantum sensing. The resonator in the two-photon gate can fit into an integrated photonic circuit that facilitates a controlled phase (c-phase) gate on dual-rail-encoded qubits, enabling universal quantum computing with full qubit-to-qubit connectivity when used with single-qubit gates. A two-photon gate can enable the essential components for room-temperature quantum error correction using lattices of qubits, such as the surface code, "binomial quantum codes," "cat-codes," etc. And a two-photon gate can be used for measurements below the standard quantum limit, including the construction of Heisenberg-limited quantum detectors and special quantum states, such as NOON states, that beat the standard quantum limit in interferometry. With this nonlinearity, it is also possible to do quantum non-demolition (QND) measurements of single photons, enabling single-photon detectors (and even QND detectors) at room temperature in the case of $\chi^{(2)}$ and $\chi^{(3)}$ materials.

A two-photon logic can process a photon wave packet including either one photon or two photons as follows. First, the photon wave packet is coupled from an optical waveguide into a first resonant mode of an optical resonator comprising a nonlinear optical material, where the first resonant mode is at a first resonance frequency. Next, the photon wave packet is nonlinearly coupled, via at least one classical control field, from the first resonant mode of the optical cavity to a second resonant mode of the optical resonator that is de-coupled from the optical waveguide. (This second resonant mode is at a second resonance frequency different than the first resonance frequency.) A phase shift of 0 is applied to the photon wave packet if the photon wave packet includes one photon or a phase shift of $\pi$ is applied to the photon wave packet if the photon wave packet includes two photons. Then photon wave packet is nonlinearly coupled, via the classical control field(s), from the second resonant mode to the first resonant mode. The photon wave packet is then coupled from the optical resonator to the optical waveguide. This processing method preserves a temporal shape (amplitude and phase) of the photon wave packet.

Coupling the photon wave packet from the optical waveguide into the first resonant mode can occur at a coupling rate greater than a full-width half-maximum of the photon wave packet.

In some cases, the nonlinear optical material comprises a $\chi^{(2)}$ material and nonlinearly coupling the photon wave packet from the first resonant mode to the second resonant mode comprises applying the classical control field(s) at a frequency equal to a frequency difference between the first resonance frequency and the second resonance frequency.

Nonlinearly coupling the photon wave packet from the first resonant mode to the second resonant mode can occur via three-wave mixing or four-wave mixing.

In other cases, the nonlinear optical material comprises a $\chi^{(3)}$ material and the classical control fields comprise a first optical control field at a first frequency and a second optical control field at a second frequency, where a frequency difference between the first frequency and the second frequency equals a frequency difference between the first resonance frequency and the second resonance frequency. In these cases, nonlinearly coupling the photon wave packet from the first resonant mode to the second resonant mode comprises coupling the first optical control field and the second optical control field into the optical resonator.

Applying the phase shift to the photon wave packet may include generating a second harmonic of the photon wave packet in the second resonant mode. The phase shift can also be applied via self-phase-modulation of the photon wave packet in the second resonant mode. Or it can be applied by nonlinearly coupling the photon wave packet from the second resonant mode to a third resonant mode of the optical resonator that is resonant with a two-level emitter, which absorbs and emits the photon wave packet in response. Alternatively, the photon wave packet can be phase shift by nonlinearly coupling the photon wave packet from the second resonant mode to a third resonant mode of the optical resonator in response to a control field and nonlinearly coupling the photon wave packet from the third resonant mode to a fourth resonant mode via second-harmonic generation.

The two-photon logic gate may include first and second optical waveguides evanescently coupled to first and second nonlinear optical resonators, respectively. The first nonlinear optical resonator has a first coupled resonant mode coupled to the first optical waveguide and a first de-coupled resonant mode de-coupled from the first optical waveguide. Likewise, the second nonlinear optical resonator has a second coupled resonant mode coupled to the second optical waveguide and a second de-coupled resonant mode de-coupled from the second optical waveguide. The two-photon logic gate also includes a beam splitter, with first and second outputs coupled to the first and second optical waveguides, respectively. The beam splitter couples a two-photon state into the first resonator via the first optical waveguide and/or into the second resonator via the second optical waveguide.

The first nonlinear optical resonator may include a first resonator having a first free spectral range (FSR) and a second resonator, optically coupled to the first resonator, having a second FSR equal to an integer multiple of the first FSR. For example, the first and second resonators may be first and second ring resonators, respectively, with different diameters. Alternatively, the first and second resonators may be first and second Fabry-Perot cavities with different optical path lengths.

The first nonlinear optical resonator can be configured to apply a phase shift of $\pi$ to a photon wave packet with two photons, e.g., via self-phase-modulation or second harmonic generation of photons in the first de-coupled resonant mode. The first nonlinear optical resonator may also include a two-level emitter configured to absorb and re-emit photons propagating in a resonant mode of the first nonlinear optical resonator.

The two-photon logic gate may also include a third optical waveguide evanescently coupled to a third nonlinear optical resonator, which supports a third coupled resonant mode coupled to the third optical waveguide and a third de-coupled resonant mode de-coupled from the third optical waveguide.

The two-photon logic gate can be included in a quantum information processor, which may also include a network of Mach-Zehnder interferometers coupled to the two-photon logic gate.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. Terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 1A shows an optical resonator implemented with integrated ring resonators for use in.

FIG. 3A illustrates a nonlinear interaction leading to π phase shift for a two-photon gate with a $\chi^{(2)}$ material.

FIG. 3B illustrates a nonlinear interaction leading to π phase shift for a two-photon gate with a $\chi^{(3)}$ material.

FIG. 6A shows a conventional gate-based model depiction of a circuit generating a GHZ state from an input state |000>.

FIG. 6B shows an "all-to-all" connectivity circuit for dual-rail encoding.

FIG. 6C shows a simplified circuit for the specific problem of generating a GHZ state from an input state |000>.

FIGS. 6D and 6E show the settings of the MZI switches and gates at the sides to implement the circuit in FIG. 6A.

DETAILED DESCRIPTION

Nonlinear Two-Photon Logic Gates Via "Catch-and-Release"

Optical nonlinearities are weak but recent progress in the fabrication and design of nano-photonic integrated circuits (nano-PICs) and nano-resonators enables an enhancement of light-matter interactions. The light-matter interaction strength can be strong enough to realize interactions between individual photons mediated by bulk nonlinear materials. The figure of merit for the nonlinear interaction in a material with a second-order nonlinearity is $F_\chi^{(2)}=\chi^{(2)}Q/\sqrt{V}$, where $\chi^{(2)}$ is the nonlinear coefficient of the material, Q is the quality factor of the resonator (a higher Q means light can be stored for a longer time), and V is the volume of the optical field profile in the resonator (a smaller volume means larger field enhancement). For a material with a third-order nonlinearity, the figure of merit is: $F_\chi^{(3)}=\chi^{(3)}Q/V$.

There have been objections to the feasibility of two-qubit gates with optical nonlinearities because the photons may interact via the nonlinear medium while they propagate as multimode photon wave packets. To avoid this problem, we convert the photons from propagating multimode photon wave packets into stationary cavity modes that are stored inside a resonator. While stored, the photons may be considered truly single-mode in the limit of zero intrinsic cavity loss (high Q). The majority of the nonlinear interaction occurs between single-mode photons if the storage time is significantly longer than the absorption and re-emission times, which is how our approach overcomes the problem of undesired nonlinear interactions among photons propagating as multimode photon wave packets.

"Catch-and-Release" with an Optical Resonator

The absorption and re-emission can work by coupling two different resonances (meaning two modes with different resonant frequencies) of a single multimode cavity. The cavity is interferometrically coupled to a waveguide, which means that light inside the resonator can leak out through (at least) two different paths that interfere, such that light at different frequencies interferes destructively (meaning the cavity mode in question is decoupled from the waveguide) or constructively (meaning the cavity mode is strongly coupled to the waveguide).

Figure 1B:
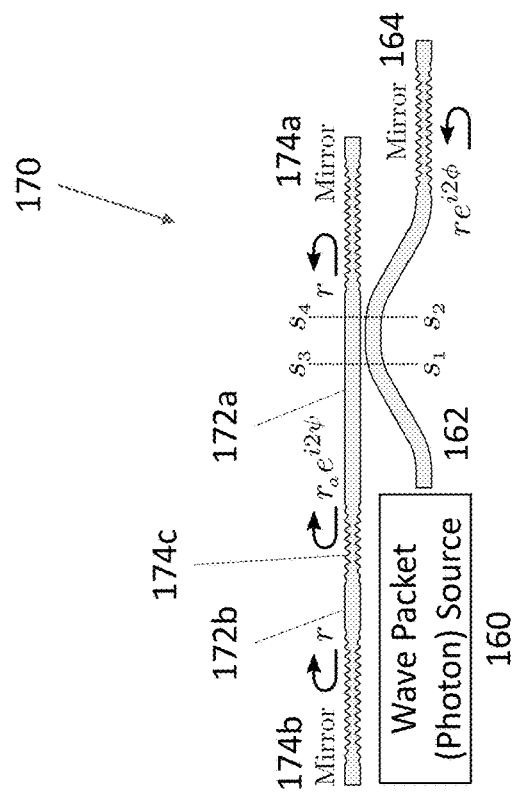
FIG. 1B shows an optical resonator implemented with integrated Fabry-Perot resonators for use in a two-photon gate.
Figure 1A:
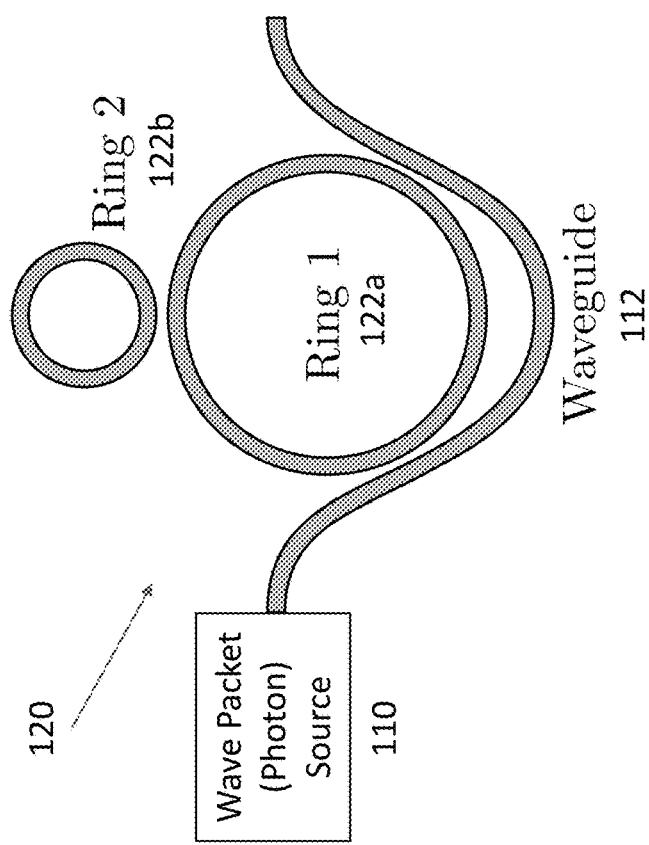

FIGS. 1A and 1B show optical resonators with optical nonlinearity using ring resonators and Fabry-Perot cavities, respectively. The two implementations are equivalent in that they can have similar transmission/reflection and intra-cavity power enhancement spectra. Each of the optical resonators includes two coupled resonators (e.g., a small ring resonator and a large ring resonator as in FIG. 1A), which ensures that unity fidelity frequency conversion is possible. The round-trip cavity lifetime of each optical resonator is shorter than the duration of the wave packet coupled from the optical waveguide to the optical resonator.

Figure 4A:
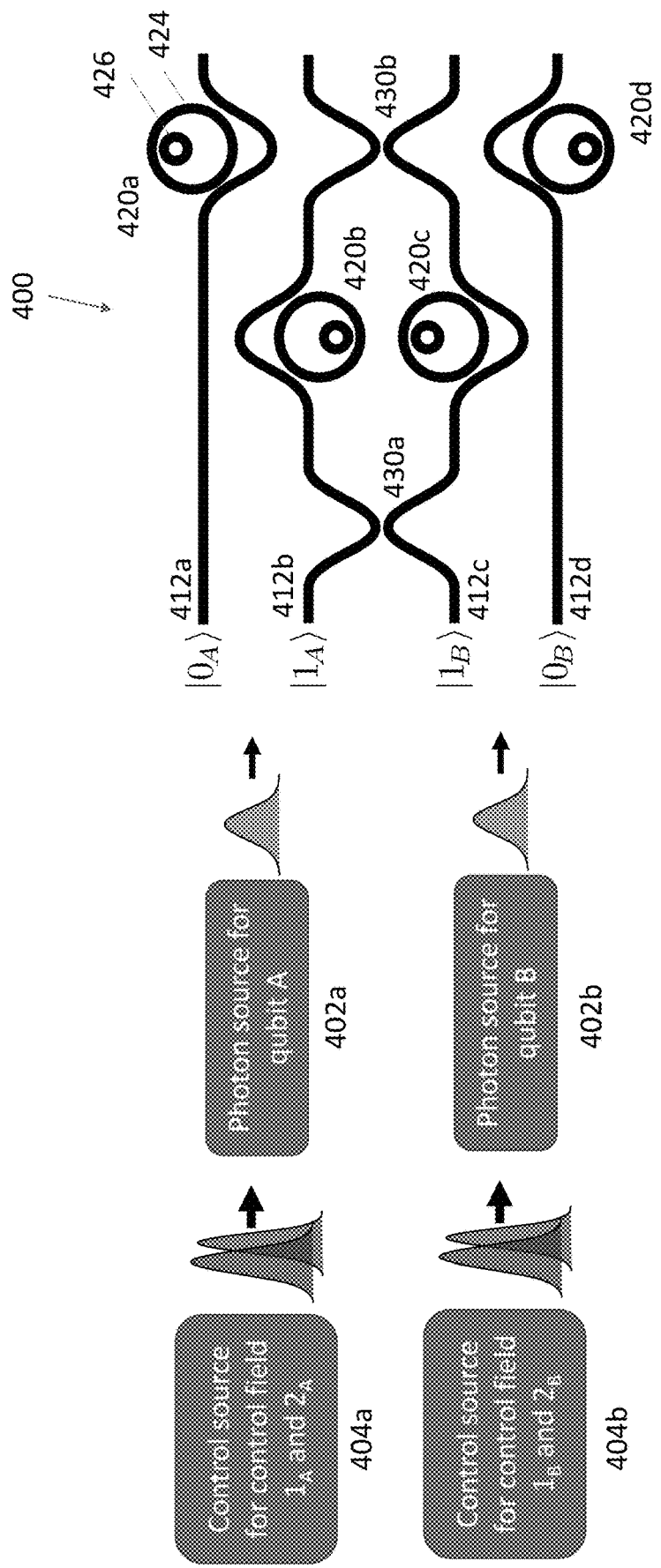
FIG. 4A shows a photonic integrated circuit (PIC) implementation of a two-photon gate structure using ring resonators.

More specifically, FIG. 1A shows an optical resonator 120 that is coupled to a source 110 of one- and two-photon wave packets via a waveguide 112. The optical resonator 120 includes a large ring resonator 122a and a small ring resonator 122b (collectively, ring resonators 122), both of which can be fabricated in the same substrate as the waveguide 112. In this case, the large ring resonator 122a is between the waveguide 112 and the small ring resonator 122b, but other arrangements are also possible. For example, the small ring resonator 122b can be inside the large ring resonator as shown in FIG. 4A (described below). Together, the ring resonators 122 support at least two photon-modes, one of which is strongly (evanescently) coupled to the waveguide 112 and one of which is de-coupled from the waveguide 112, and one or more control-modes.

The ring resonators 122 are made at least partially of or include a nonlinear material, such as a $\chi^{(2)}$ material, a $\chi^{(3)}$ material, or a two-level emitter. This nonlinear material causes a coupling of the photon-modes. In the case of a $\chi^{(2)}$ material, a single electric control field (oscillating at the difference-frequency of the two photon-modes) causes the fields in the two photon-modes to couple via three-wave-mixing. The difference frequency can also be optical, which enables faster gate operation. For optical difference frequencies, it can be more efficient for the optical control field to occupy a cavity control mode, but this is not necessary. If the optical control field occupies a cavity control mode, the control field intensity can be smaller, which is useful for being able to separate the strong control fields from the single photons on a PIC. In the case of a $\chi^{(3)}$ material, such as silicon, silicon nitride, or Hydex, two control fields (each oscillating at optical frequencies but with a difference in carrier frequency corresponding to the difference-frequency of the two modes) couple the two photon-modes via four-wave-mixing.

Since several types of nonlinearities may be used in these two-photon logic gates, there are a variety of material platforms that would work for implementing these two-photon logic gates in a photonic integrated circuit with low loss, fast switching, and high fidelity. Materials with a large $\chi^{(2)}$ coefficient, such as LiNbO$_3$, GaAs, or AlGaAs, are especially suitable for making the resonators in a two-photon logic gate. Nano-fabrication of ultra-low loss waveguides and cavities in LiNbO$_3$ have been demonstrated recently along with modulators operating with CMOS compatible voltages. Another possibility is to use silicon with a DC-electric field induced $\chi^{(2)}$ nonlinearity and operate with qubits (photons) at wavelengths above 2.3 microns. Operating at longer wavelengths could also be done in materials like GaAs or AlGaAs, which have $\chi^{(2)}$ coefficients that are about an order of magnitude larger than those of LiNbO$_3$.

GaAs can also be used to host two-level emitters in the form of high-performance quantum dots. In a GaAs device, the $\chi^{(2)}$ nonlinearity can be used for the catch-and-release, and quantum dots can facilitate the nonlinear interaction between the photons for the two-qubit gates.

Using two ring resonators 122 instead of a single ring resonator increases the coupling efficiency between the photon-modes from 50% to 90% or higher. To see why, consider a signal field propagating in a single ring resonator pumped with two strong pump fields, which are separated in frequency from each other by the single ring resonator's free spectral range (FSR). The signal field can be up-converted or down-converted by one FSR with equal probability in a three-wave mixing process due to the single ring resonator's symmetry.

Adding a second ring resonator breaks this symmetry, leading to preferential up-conversion (or down-conversion). In this case, the diameters and refractive indices of the ring resonators 122 are selected such that the FSR of one ring resonator is an integer multiple of the FSR of the other ring resonator. When ring resonators' resonances align with each other, the coupling-induced mode-splitting effectively eliminates either the up- or down-converted resonance, leading to near-unity conversion efficiency to the remaining resonance. (Equivalently, the second ring resonator 122b can be viewed as adding a phase to the field propagating in the first ring resonator 122a or tuning a dispersion of the first ring resonator 122b.)

FIG. 1B shows a Fabry-Perot-based resonator 170 suitable for implementing a two-photon logic gate. The resonator 170 is coupled to a one- and two-photon wave packet source 160 via a waveguide 162, which is coupled to a dielectric mirror 164 that imparts a phase shift of $\phi$ on the reflected beam. The resonator 170 includes a pair of Fabry-Perot cavities 172a and 172b (collectively, cavities 172), each of which has a different optical path length and terminates in a separate dielectric mirror 174a/174b. The cavities 172 are coupled together via a partially reflecting dielectric mirror 174c that imparts a phase shift of $\psi$ on the reflected beam. Like the ring resonators 122 in FIG. 2A, the Fabry-Perot cavities 172 include nonlinear material, such as a $\chi^{(2)}$ material, a $\chi^{(3)}$ material, or a two-level emitter. In addition, the FSR of one cavity 172 is an integer multiple of the FSR of the other cavity 172. As a result, the Fabry-Perot-based resonator 170 behaves like the ring-based resonator 120 described above.

Figure 2A:
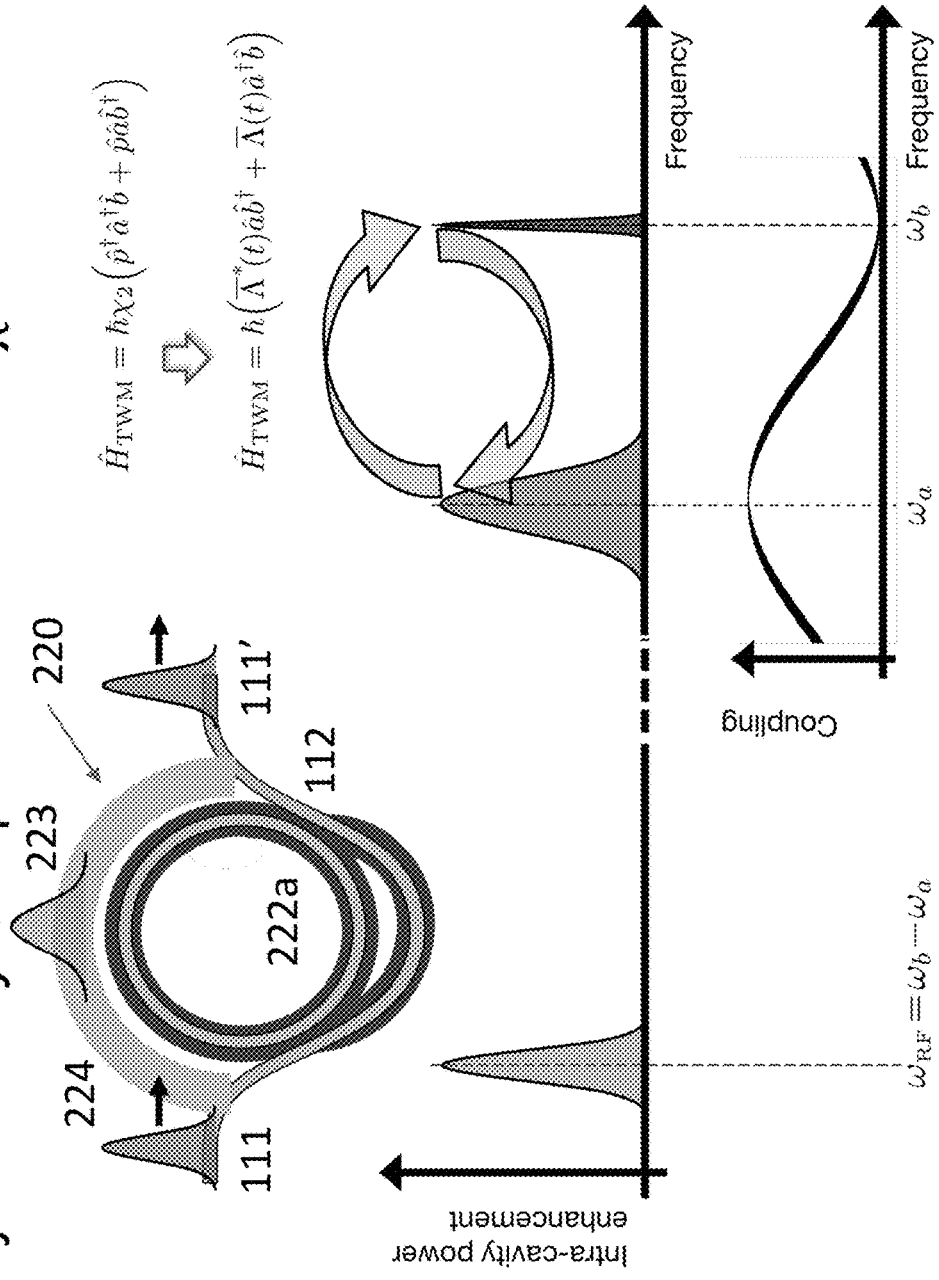
FIG. 2A illustrates the photon absorption and re-emission process for a $\chi^{(2)}$ material in a two-photon gate implemented with ring resonators.
Figure 2B:
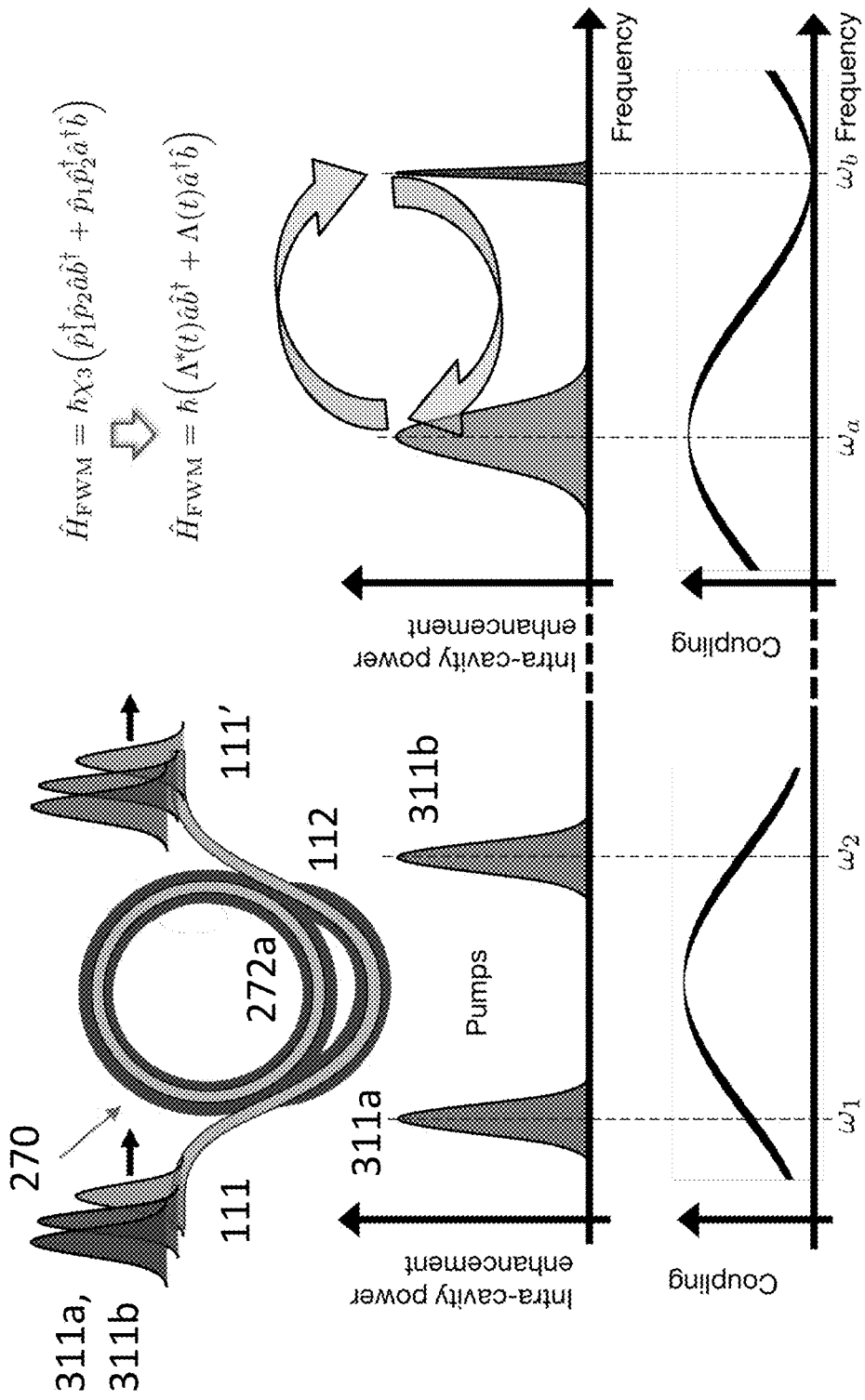
FIG. 2B illustrates the photon absorption and re-emission process for a $\chi^{(3)}$ material in a two-photon gate implemented with ring resonators.

FIGS. 2A and 2B illustrate the "catch-and-release" process, without any nonlinear interaction, implemented in resonators for two-photon logic gates. FIG. 2A illustrates the photon absorption and re-emission process for a $\chi^{(2)}$ material in a two-photon gate implemented with a resonator 220 like the one in FIG. 1A made with $\chi^{(2)}$ material. The upper left panel shows a first ring resonator 222a and the waveguide 112 (the second ring resonator 122b is omitted for clarity). The waveguide 112 couples a photon wave packet 111 from the photon wave packet source 110 (FIG. 1A) into the ring resonator 122a. The semi-circle above the top half of the large ring resonator 222a indicates an electrode 224 applying a radio-frequency (RF) electric control field 223 (with a temporal shape indicated by the middle pulse above the semi-circle) to the $\chi^{(2)}$ material in the first ring resonator 222a.

The middle panel of FIG. 2A shows a spectrum indicating resonant modes of the resonator 220. The photon wave packet 111 propagates in a first photon mode, at $\omega_a$, which is strongly coupled to the waveguide 112. The RF control field 223, which is at $\omega_{RF}=\omega_b-\omega_a$, non-linearly up-converts the photon wave packet 111 to a second photon mode, at $\omega_b$, which is de-coupled from the waveguide 112. The RF control field 223 is applied to the nonlinear material in the resonator 220 via the electrode 224. Loading and unloading the resonator 220 as fast as possible avoids cavity losses. This suggests that the RF control field 223 should be at as high a frequency as possible (e.g., 100 GHz).

An optical control field (not shown in FIG. 2A) would arrive through a waveguide, such as the same waveguide 112 that guides the input photon wave packet. The optical control filed would then be coupled into a control mode that is strongly coupled to the waveguide to achieve cavity enhancement of the control field and also allow the control field to be coupled in and out of the resonator 220 fast enough to achieve the desired amplitude and phase temporal distribution inside the resonator. Optical control fields are even higher frequency than RF control fields and can be modulated faster as a result (e.g., at THz rates).

The bottom panel of FIG. 2A shows a spectrum of the coupling between the resonator 220 and the waveguide 112 (high coupling at the strongly coupled mode at $\omega_a$ and zero coupling at the de-coupled mode at $\omega_b$). Because the coupling between the resonator 220 and the waveguide 112 is weak at $\omega_b$, the photon wave packet 111 remains in the de-coupled mode at $\omega_b$ until it is down-converted to the strongly coupled mode at $\omega_a$ by another RF control field 223 and coupled back into the waveguide 112 as an outgoing photon wave packet 111'.

The temporal shapes of the control field 223 may be controlled to exactly absorb an incoming photon with an arbitrary incoming photon wave packet 111 (time-symmetric wave packets like a Gaussian work especially well). The control field can be calculated exactly for both emission and absorption of a photon wave packet, even in the presence of loss. Other approaches assume adiabatic elimination of the strongly coupled mode or that the emission control is the time reversed absorption control, which is not true in the presence of loss. Our calculation gives the exact result with loss without approximation, which ultimately results in better fidelity of the absorption and emission process.

The same photon wave packet 111' can be emitted from the resonator 220 after the interaction (the absorption of the incoming photon). The same control field 223 work to absorb/emit either one or two incoming photons (and may work for absorbing or emitting more than two photons as well) in the limit where there is no nonlinear interaction between the photons in the photon wave packet 111 and the control field 223.

If there is a nonlinear interaction between these photons, the optimum control field 223 are different for one- or two-photon inputs. This limits the fidelity of the gate operation. We choose to optimize the control field 223 for the case when there is one input photon. There is still some finite amount of error in the absorption/emission process because it is impossible to perfectly absorb/emit a photon wave packet 111 of finite duration. However, this error drops as the ratio of the coupling rate of the strongly coupled mode, $\gamma$, and the full-width-at-half-maximum (FWHM) (in the frequency domain) of the photon wave packet 111, $\Delta\omega$, increases ($\gamma \gg \Delta\omega$). Theoretically, the error becomes completely negligible for ratios of $\gamma/\Delta\omega \approx 5$ for $\chi^{(2)}$ material and $\gamma/\Delta\omega \approx 30$ for $\chi^{(3)}$ material.

By designing a resonator with a large enough coupling rate $\gamma$ for the strongly coupled mode at $\omega_a$, the only source of error should come from the imperfect control pulse in the case of two incoming photons (and loss). For incoming photons with Gaussian wave-packets (with a frequency full-width-at-half-maximum of $\Omega$), the coupling rate $\gamma$ should be about 5 times larger than $\Omega$ for a $\chi^{(2)}$ material and about 30 times larger than $\Omega$ for a $\chi^{(3)}$ material to achieve negligible error in loading and unloading a single photon. (These ratios may be different for wave packets with non-Gaussian shapes.) In that regime, the error is measured by the overlap (for a two-photon input) between the output wave packet and the ideal output wave packet (which is a simple time-translated version of the input wave packet). With more cavity modes and more control fields, it is possible to devise a two-stage absorption procedure that makes the absorption/emission completely linear, due to the fact that the nonlinear interaction can effectively be turned on and off by a second control pulse (this is true for $\chi^{(2)}$ nonlinearity and emitter-based nonlinearity, e.g., as in FIG. 3D).

FIG. 2B illustrates the photon absorption and re-emission process for a resonator 270 with $\chi^{(3)}$ material in a two-photon gate implemented (again, only the waveguide 112 and larger ring resonator 272a are shown for clarity). One difference between the $\chi^{(3)}$ process in FIG. 2B and the $\chi^{(2)}$ process in FIG. 2A is that there are two optical control fields 311a and 311b (collectively, control fields 311) at frequencies of $\omega_1$ and $\omega_2$, respectively, that get launched into the resonator 270 via the waveguide 112 instead of being delivered from an electrode. The frequency separation between the control fields 311 is equal to the frequency separation between the strongly coupled and de-coupled photon modes, i.e., $\omega_2 - \omega_1 = \omega_b - \omega_a$.

The control fields should both be far enough from the photon fields to avoid spontaneous production of new photons from the control fields (via spontaneous four wave mixing that originates from the same $\chi^{(3)}$ nonlinearity). There are different ways of achieving this with dispersion engineering or bandgap engineering for Fabry-Perot cavities. The photon fields could be at 1550 nm and the pumps should be at longer wavelengths separated by tens of nanometers to one hundred nanometers.

The control fields 311 interact with the photon wave packet 111 via four-wave mixing (FWM) to upconvert the photon wave packet 111 from $\omega_a$ to $\omega_b$. The upconverted wave packet propagates in the resonator's decoupled mode at $\omega_b$ until it is down-converted to $\omega_a$ via FWM with another set of control fields 311. The down-converted wave packet propagates in the resonator's strongly coupled mode at $\omega_a$ and is coupled out of the resonator 270 and into the waveguide 112 as the outgoing wave packet 111'.

Nonlinear Interactions with Optical Resonators for Two-Photon Logic Gates

FIGS. 3A-3E illustrates how different nonlinearities in an optical resonator can be used to achieve a $\pi$ phase difference between photon wave packets with one or two input photons. These photon wave packets may be "caught" in the optical resonator using a "catch-and-release" process like the ones in FIGS. 2A and 2B, then phase shifted as desired with a nonlinear interaction. An inventive two-photon gate should work with any nonlinear interaction. $\chi^{(2)}$ and $\chi^{(3)}$ nonlinear interactions are particularly feasible because they are already present in the materials of a photonic integrated circuit (PIC) and could work at room temperature. Interactions with atom-like two-level and three-level emitters are also interesting because their nonlinearity is very large, but they may involve cryogenic cooling.

FIG. 3A illustrates a nonlinear interaction leading to $\pi$ phase shift for a two-photon gate with a $\chi^{(2)}$ material. If two photons are present in the first de-coupled mode, $\omega_b$, they couple to a second de-coupled mode, $\omega_t$, via second harmonic generation (SHG). The control fields that absorb and emit the photons are timed such that the two photons undergo one Rabi oscillation (Two photons in the first de-coupled mode at $\omega_b$ are converted into a single photon at twice the frequency $\omega_c$ at the second de-coupled mode and back to two photons at the first de-coupled mode). When the population in the first de-coupled mode, $\omega_b$, goes to zero, the population's amplitude changes sign. The population is the absolute-square of the amplitude, so the population is +1 after one Rabi oscillation, but the amplitude is −1 (the phase is $\pi$). If only one photon is present, it cannot couple to the second de-coupled mode at $\omega_c$ and so does not experience the $\pi$ phase shift.

FIG. 3B illustrates a nonlinear interaction leading to $\pi$ phase shift for a two-photon gate with a $\chi^{(3)}$ material. For a $\chi^{(3)}$ material, the phase shift comes from storing the input photons for an amount of time that corresponds to a $\pi$ phase accumulation via self-phase-modulation (SPM) in the de-coupled mode at $\omega_b$. A single input photon does not undergo SPM; this causes the phase difference.

Figure 3C:
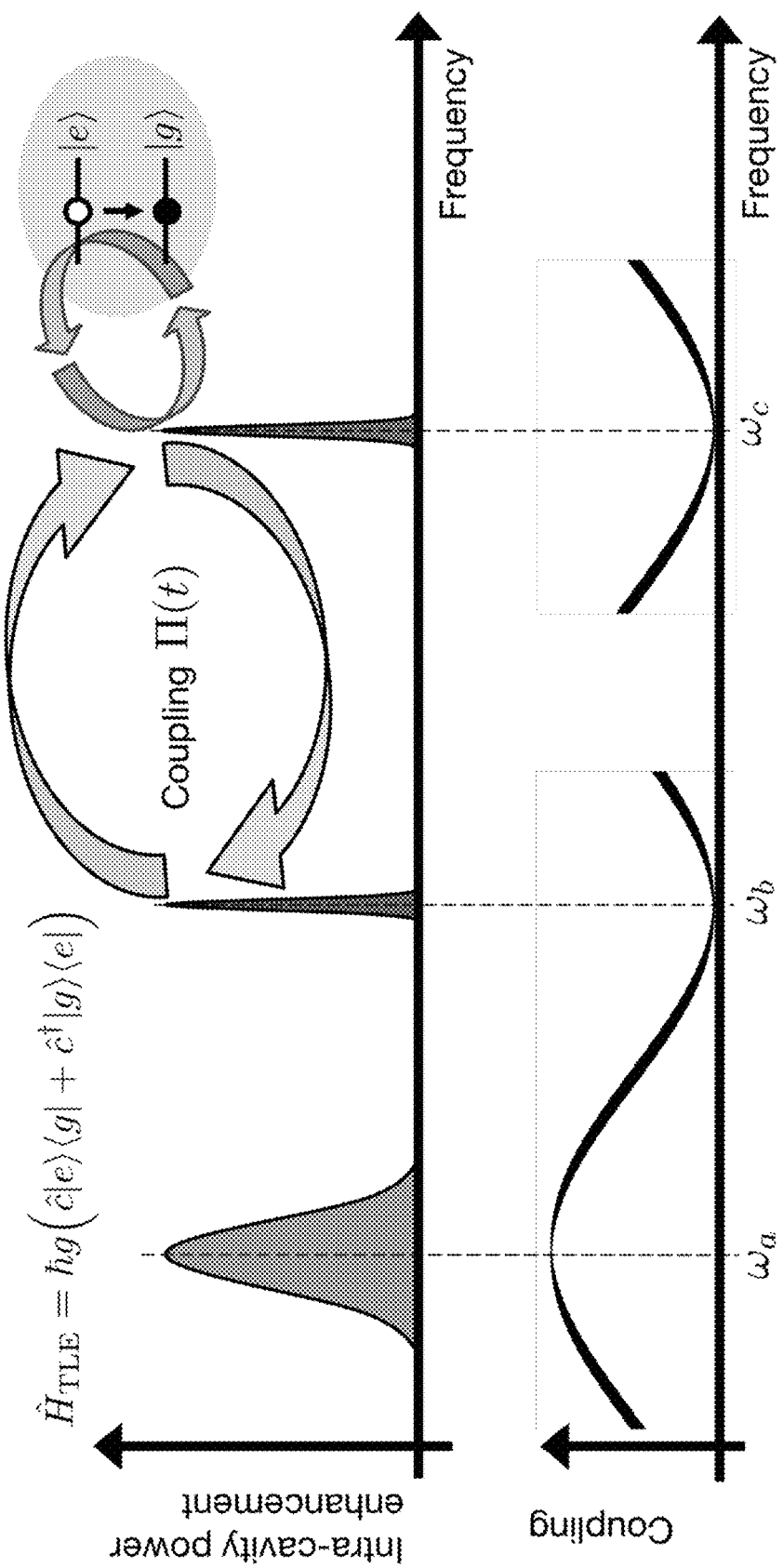
FIG. 3C illustrates a nonlinear interaction leading to π phase shift for a two-photon gate with a two-level emitter (TLE) as the nonlinearity.

FIG. 3C illustrates a nonlinear interaction leading to it phase shift for a two-photon gate with a two-level emitter (TLE) as the nonlinearity. The TLE is resonant with the de-coupled mode at $\omega_c$. An additional control field ($\Pi(t)$), similar to the control field responsible for loading and unloading, couples the de-coupled modes at $\omega_b$ and $\omega_c$ to each other after the photons have been absorbed into the lower-frequency de-coupled mode ($\omega_b$) via the strongly coupled mode ($\omega_a$). By choosing a suitable control field $\Pi(t)$, it is possible to achieve a scenario where the population of the lower-frequency de-coupled mode starts and ends at 1 for both one input photon and two input photons, but the phase after the control field differs by $\pi$.

Figure 3D:
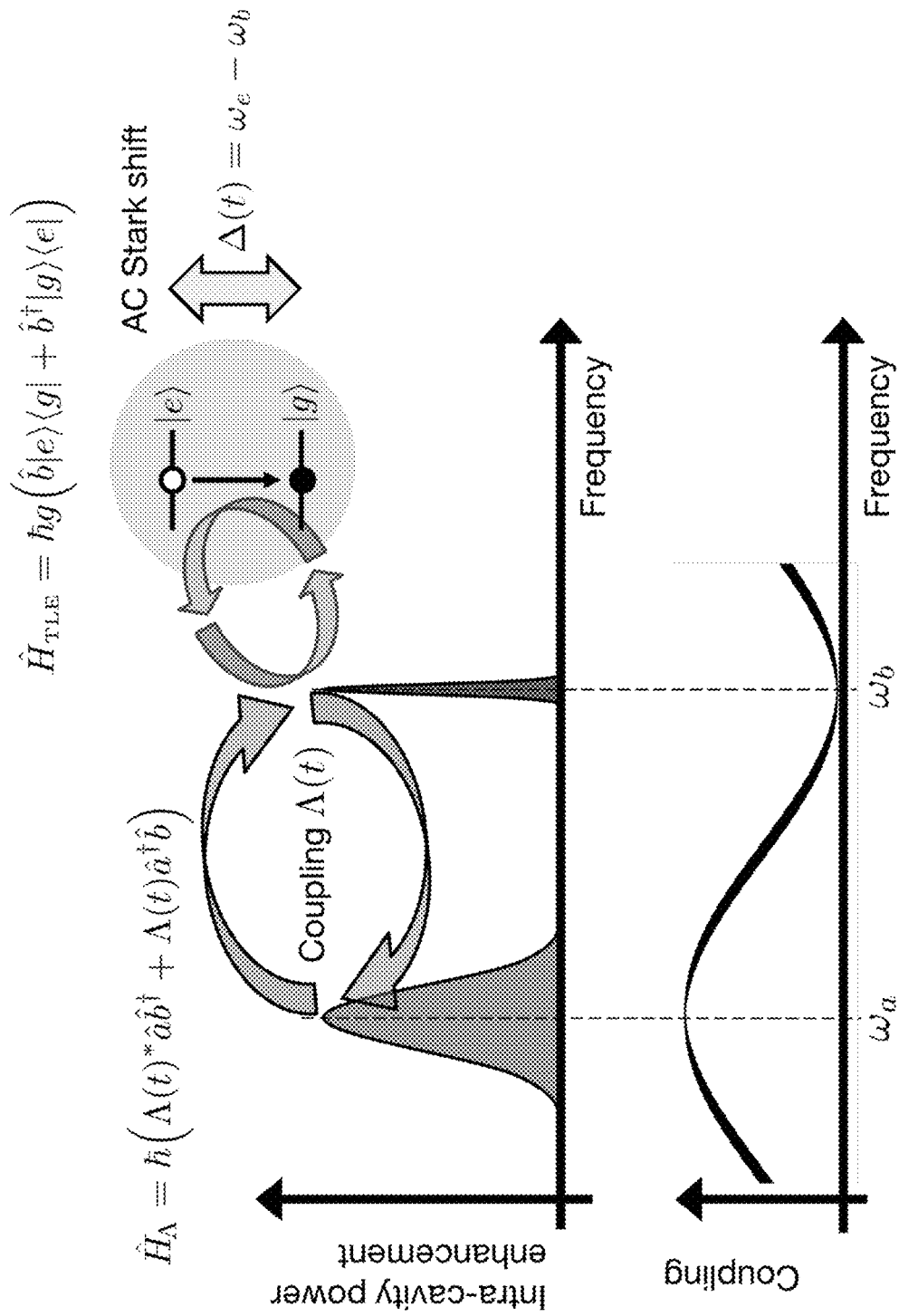
FIG. 3D illustrates a nonlinear interaction that uses a Stark shift to detune the TLE from the cavity while the photons are loaded and unloaded, which effectively decreases the nonlinearity temporarily such that the loading and unloading can still occur with high fidelity.

FIG. 3D shows how a Stark shift can detune the TLE from the cavity while the photons are loaded and unloaded, which effectively decreases the nonlinearity temporarily such that the loading and unloading can still occur with high fidelity. Many types of TLEs are sensitive to electric fields, which could become problematic if the control field originates from an applied RF field. The optical control fields would not interact with the TLE as they would be very far off-resonant. However, for a TLE coupled to the de-coupled mode ($\omega_b$), a strong enough RF control field, $\Lambda(t)$, could effectively detune the TLE and the de-coupled mode ($\omega_b$) during absorption and emission via an AC Stark shift of the TLE transition energy. This would reduce the effective nonlinear coupling between the photons during absorption and emission and could eliminate the other de-coupled mode ($\omega_c$) and increase the gate operation speed.

Figure 3E:
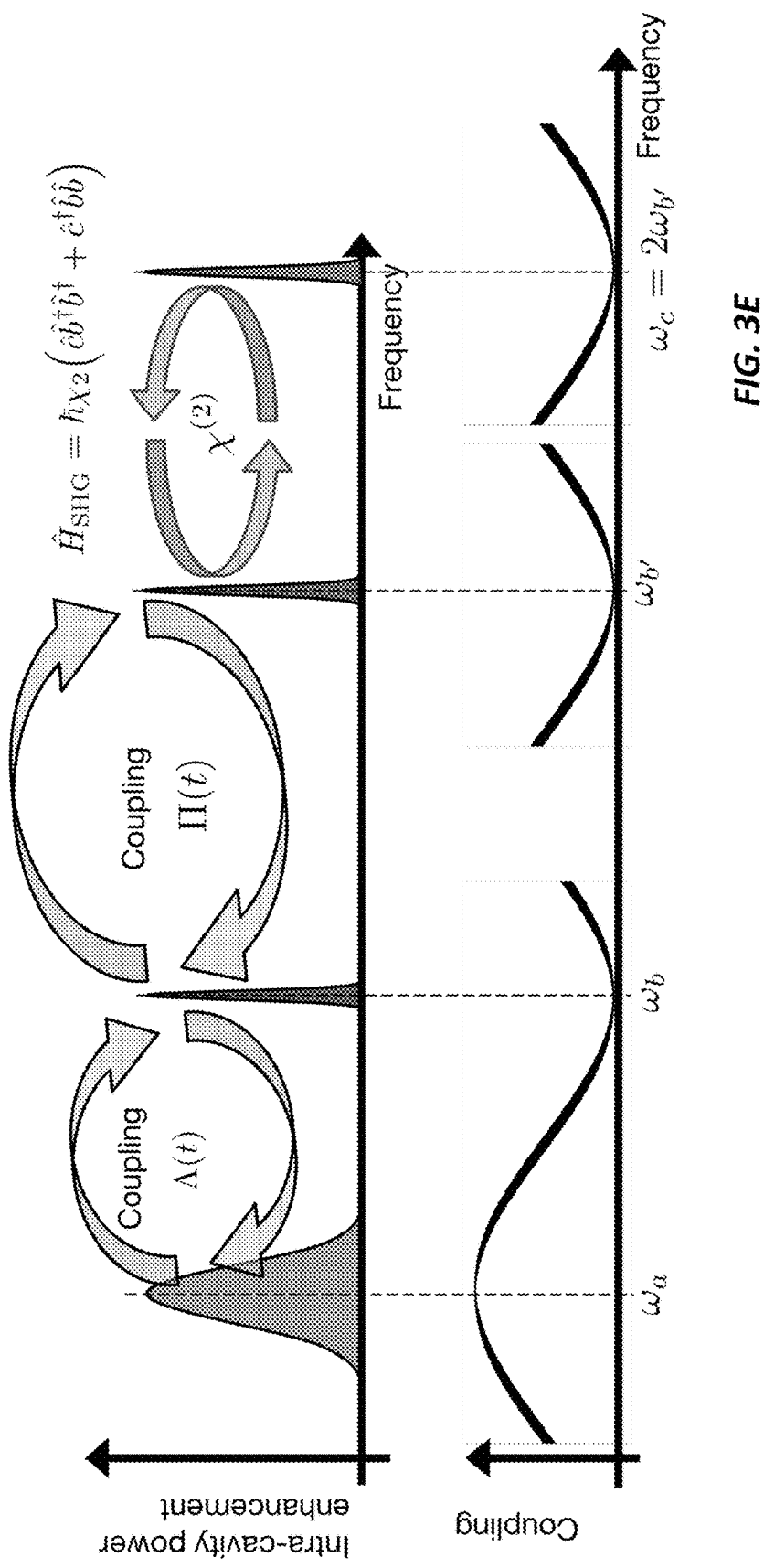
FIG. 3E illustrates an extended nonlinear interaction scheme for $\chi^{(2)}$ material.

FIG. 3E illustrates a nonlinear, two-stage absorption in a two-photon gate with a $\chi^{(2)}$ material. This configuration removes the effect of the nonlinearity from the absorption and emission process. As in FIG. 3A, photons in the strongly coupled mode ($\omega_a$) to a first de-coupled mode ($\omega_b$) in response to a first strong enough RF control field, $\Lambda(t)$. A second control pulse ($\Pi(t)$) effectively turns the nonlinearity on and off by coupling the photons from the first de-coupled mode ($\omega_b$) to a second de-coupled mode ($\omega_b'$). From there, the photons couple to a third de-coupled mode, $\omega_c$, via second harmonic generation (SHG).

Photonic Integrated Circuit Implementation

Figure 4B:
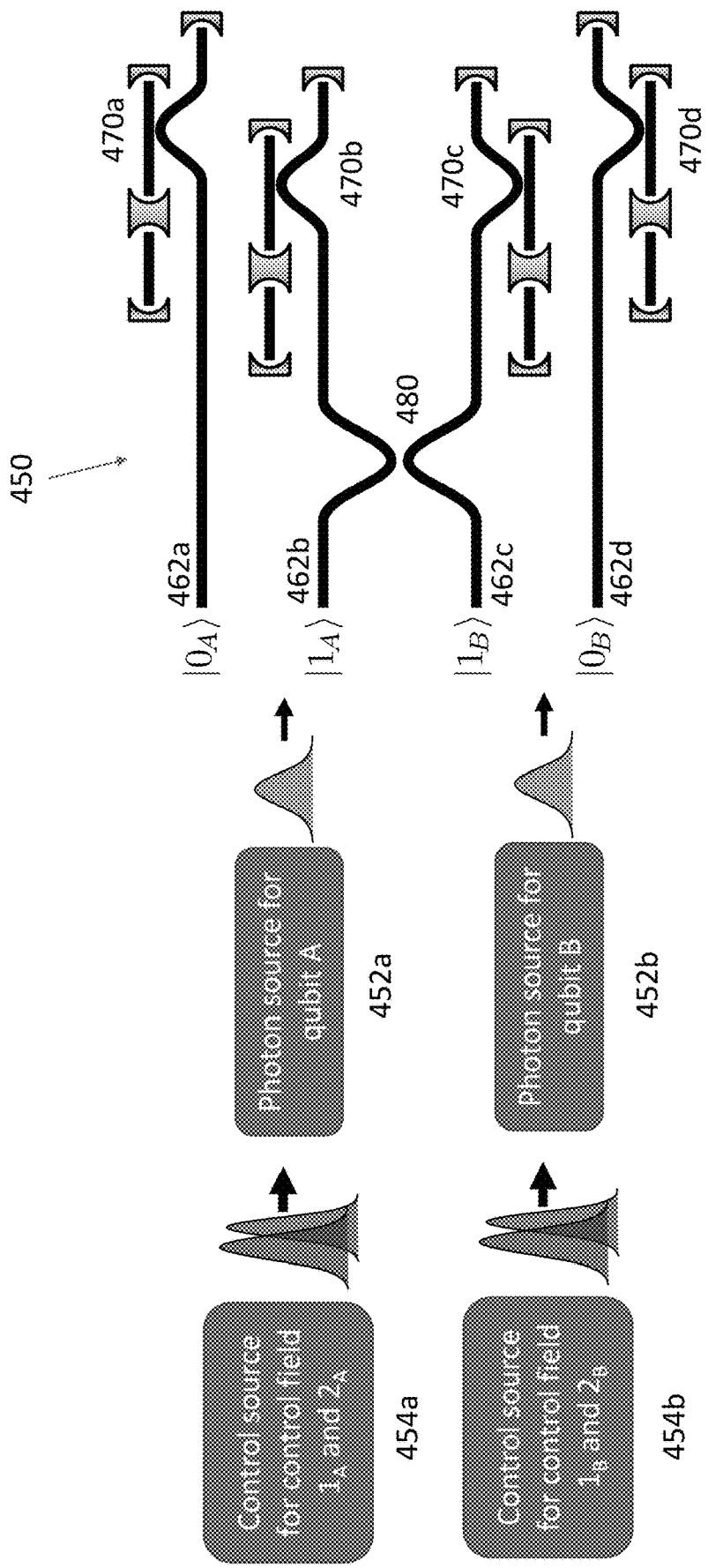
FIG. 4B shows a PIC implementation of a two-photon gate structure using Fabry-Perot resonators.

FIGS. 4A and 4B show two-photon logic gates implemented in photonic integrated circuits with ring resonators as in FIG. 1A and Fabry-Perot resonators as in FIG. 1B, respectively. These gates implement a controlled phase operation. They have the following truth table: |00>→|00>, |01>→|01>, and |10>→|10>, and |11>→−|11>.

More specifically, FIG. 4A shows a two-photon logic gate 400 with waveguides 412a-412d, ring resonators 420a-420d, and 50/50 beam splitters 430a and 430b. The input states enter the two-photon logic gate 400 at from photon sources 402a and 402b at left, and the output states come out on the right side of the two-photon logic gate 400. The top waveguide 412a couples input state $|0_A\rangle$ to the top ring resonator 420a. Likewise, the bottom waveguide 412d couples input state $|0_B\rangle$ to the bottom ring resonator 420d. The upper middle waveguide 412b and lower middle waveguide 412c couple the input states $|1_A\rangle$ and $|1_B\rangle$ to the upper middle ring resonator 420b and lower middle ring resonator 420c via the first beam splitter 430a. The second beam splitter 430b couples the outputs of the upper middle ring resonator 420b and lower middle ring resonator 420c.

Control sources 404a and 404b generate optical control fields for controlling the gate 400. These optical control fields that may arrive in the same waveguides as the input states or from different waveguides. If different waveguides are used, the couplers should be constructed such that the photon fields do not couple in and out via the control couplers. This can be achieved via interferometric coupling as shown in FIGS. 1A and 1B or via phase mismatching the waveguide mode and cavity waveguide mode at the photon field frequencies. Electrical control fields can be delivered by electrodes over or next to the resonators (e.g., as in FIG. 2A). The electrodes can be in a different (e.g., top layer of the PIC) or deposited next to the resonator in the same layer via postprocessing fabrication steps.

FIG. 4B shows a two-photon logic gate 450 using waveguides 462a-462d, Fabry-Perot resonators 470a-470d, and a single 50/50 beam-splitter 480. The input states enter the two-photon logic gate 400 from photon sources 452a and 452b at left, and the output comes out on the left side of the two-photon logic gate 400 due to the reflections that occur at the Fabry-Perot resonators 470a-470d. Control sources 454a and 454b generate optical control fields for controlling the gate 450 as described above with respect to FIG. 4A.

The top waveguide 462a couples input state $|0_A\rangle$ to and from the top Fabry-Perot resonator 470a. Likewise, the bottom waveguide 462d couples input state $|0_B\rangle$ to the bottom Fabry-Perot resonator 470d. The upper middle waveguide 462b and lower middle waveguide 462c couple the input states $|1_A\rangle$ and $|1_B\rangle$ to the upper middle Fabry-Perot resonator 470b and lower middle Fabry-Perot resonator 470c via the first beam splitter 480.

In both logic gates 400/450, if the input state is |11>, the beam-splitter 430a/480 at the input causes the Hong-Ou-Mandel effect to turn the input state into |02>+|20> such that a two-photon state impinges on either the top resonator 420a/470a or the (identical) bottom resonator 420d/470d. It doesn't matter whether the input state impinges on the top resonator 420a/470a or the bottom resonator 420d/470d; quantum mechanically, the two photons go through both paths and they achieve the π phase shift in both paths using one of the techniques shown in FIGS. 3A-3E such that they recombine to the |11> state after the second beam splitter 430b (FIG. 4A) or reflecting back through the input beam splitter 480 (FIG. 4B). After any of the nonlinear interaction processes described above with respect to FIGS. 3A-3E, the state is −(|02>+|20>) and the beam-splitter transforms the state to −|11> (the sign is flipped on the states with two photons). "Catch-and-release" cavities are included in the |0> arms (i.e., the top and bottom arms) to ensure a uniform delay of all input states so that the other states transform as |00>→|00>, |01>→|01>, and |10>|10> to achieve the desired truth table of the controlled phase gate.

Ping-Pong Architecture with Two-Photon Logic Gates for a Quantum Computer

Figure 5:
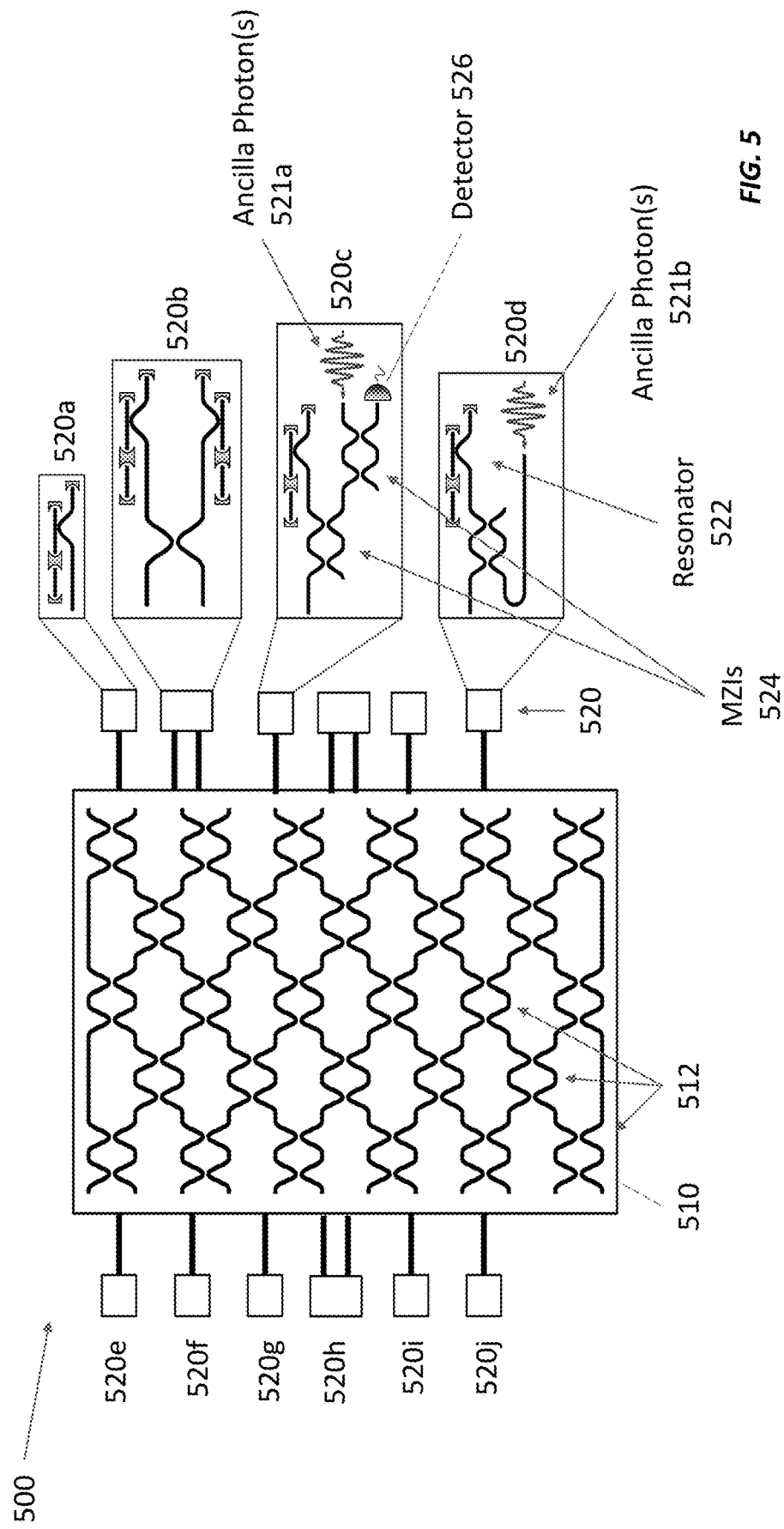
FIG. 5 illustrates a "Ping Pong" architecture with two-photon gates.

FIG. 5 illustrates a "ping-pong" architecture 500 for a quantum computer with two-photon gates. This architecture 500 can be fabricated in a photonic integrated circuit (PIC) using suitable patterning techniques for creating waveguides and cavities in dielectric materials. It is called a ping-pong architecture 500 because, in operation, photons propagate back and forth through a central (linear) circuit 510 between sources, logic gates, and detectors coupled to either side of the central circuit. The central circuit 510 is built from one or more Mach-Zehnder interferometer (MZI) unit cells 512, each of which can perform arbitrary single-qubit rotations on dual-rail encoded photonic qubits.

A variety of quantum logic gates 520a-520j (collectively, gates 520) are coupled to the sides of the central circuit 510 as illustrated in FIG. 5. These gates 520 may include a "catch-and-release" cavity 520a (as shown on the top right) and a two-photon controlled-phase (c-phase) gate 520b (second from the top right), which includes a "catch-and-release" cavity. These gates perform logic operations on the photons switched through the central circuit 510.

The two lower gates 520c and 520d on the right side of the central circuit 510 illustrate that the ends of the central circuit 510 can also be connected to sources and detectors. The photons from the sources can be used in the central circuit 510 and/or in gate operations. In the gate 520c from the bottom right of FIG. 5, an ancilla photon 521a goes into the central circuit 510 to initialize states. In the very bottom right gate 520d of FIG. 5, the extra photon 521b is going into a resonator 570 for use in a gate operation.

FIG. 5 shows that the ping-pong architecture 500 can be used for state initialization, manipulation/processing, and readout/detection. For example, gate 520c includes two Mach-Zehnder interferometers (MZIs) 524 that can be used to switch between the states coming from the linear circuit 510 to other gates 520 or detectors, including the detector 526 in the gate 520c. These MZIs 524 can also be used to inject photonic states from the outside. These photonic states could be either single photons or more advanced states, such as entangled Bell pairs or 3-qubit GHZ states, from an external supply (not shown). The processor 500 could also be able to produce any initial state from a simple resource of single photons. A variety of qubit encodings may be used beyond dual-rail, and the sequence of linear circuits and nonlinear gates that most efficiently implements different algorithms using different encodings can be optimized, e.g., via classical machine learning techniques.

After state initialization, the processing occurs while the photons are bouncing back and forth across the linear circuit shown in FIG. 5. The large array of MZI switches 512 in the central circuit 510 ensures the connectivity of the qubits and the gates 520 at the sides introduce multi-qubit operations based on nonlinear interactions in "catch-and-release" cavities. Two-qubit c-phase gates like those described above and shown as gate 520b is just one possible type of gate; in general, there could be a toolbox of different gates 520 to attach on the sides of the linear circuit 510. These gates 520 could even be reconfigured on each photon round-trip through the linear circuit 510. With simple circuitry it is possible to include detectors and ancilla photons 521 into the "toolbox" gates at the ends of the circuit 510, which is also illustrated in FIG. 5.

The architecture 500 in FIG. 5 is compatible with space-efficient bosonic error correcting codes.

Ping-Pong Scheme for Quantum Circuits with Arbitrary Depth

FIGS. 6A-6E illustrate how the ping-pong architecture 500 in FIG. 5 can implement any circuit from a gate-based-model. FIG. 6A shows a conventional gate-based model depiction of a circuit generating a GHZ state from an input state |000>. The qubits in FIG. 6A are shaded to correspond to the paths in FIGS. 6D and 6E. The vertical dashed lines in FIG. 6A panel indicate cuts where the qubits would traverse the linear circuit 510 in the Ping-Pong architecture 500 of FIG. 5.

For universality, FIG. 6B depicts a 3×3 qubit (6×6 modes) linear circuit 610 of MZIs 612 to show that "all-to-all" connectivity of the qubits is possible at each bounce across the linear circuit 610. This may not be optimal from a complexity point of view because the depth of this linear circuit 610 is the same as that of the gate-based-model (FIG. 6A) and additionally has to be traversed N times (where N is the number of qubits or depth of the gate-based-circuit). Fortunately, the generalized circuit of FIG. 6B can be replaced by a much shallower circuit 611 as illustrated in FIG. 6C, which generates a GHZ state from an input state |000>. By reconfiguring the gates (not shown) to simply function as mirrors (with a time-delay due to the catch-and-release procedure) one can always introduce a trade-off between the number of physical layers and the number of bounces back and forth through the linear circuit 610, 610' (an N×N circuit can be replaced by a N×1 circuit traversed N times).

FIGS. 6D and 6E show the settings of the MZI switches 612 in the linear circuit 610 and gates 620 at the sides of the linear circuit 610 to implement the circuit in FIG. 6A. The shaded paths indicate which way the photons traverse the linear circuit 610 for the two different settings. In FIG. 6D (setting 1), the upper left MZI 612 is set to exchange (cross) inputs, and the other MZIs 612 are set not to exchange inputs. In FIG. 6E (setting 2), the middle MZI 612 in the third and fifth rows of MZIs 612 and both MZIs 612 in the fourth row of MZIs 612 are set to exchange (cross) inputs, and the other MZIs 612 are set to transmit inputs. When this circuit is implemented in a PIC, the transit time across the PIC, which can have a length on the centimeter-scale, is only about 100 ps in a high-index dielectric material, such as silicon.

A $cm^2$-scale chip may accommodate about 1000 or more spatial modes for a total of about 1000 qubits (depending on the encoding). The linear circuit 610 enables full connectivity between any of these qubits. On the other side, the optical modes are absorbed into the nonlinear cavities and subsequently released back across the linear circuit 610 (now with a new setting). The nanosecond-scale delay in the cavities is sufficient for reprogramming of the linear circuit 610.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of processing a photon wave packet including either one photon or two photons, the method comprising:
    coupling the photon wave packet from an optical waveguide into a first resonant mode of an optical resonator comprising a nonlinear optical material, the first resonant mode being at a first resonance frequency;
    nonlinearly coupling the photon wave packet, via at least one classical control field, from the first resonant mode of the optical resonator to a second resonant mode of the optical resonator that is de-coupled from the optical waveguide, the second resonant mode being at a second resonance frequency different than the first resonance frequency;
    applying a 0 phase shift to the photon wave packet if the photon wave packet includes one photon or a $\pi$ phase shift to the photon wave packet if the photon wave packet includes two photons;
    nonlinearly coupling the photon wave packet, via the at least one classical control field, from the second resonant mode to the first resonant mode; and
    coupling the photon wave packet from the optical resonator to the optical waveguide.

2. The method of claim 1, wherein the method preserves a temporal shape of the photon wave packet.

3. The method of claim 1, wherein coupling the photon wave packet from the optical waveguide into the first resonant mode occurs at a coupling rate greater than a full-width half-maximum of the photon wave packet.

4. The method of claim 1, wherein the nonlinear optical material comprises a $\chi^{(2)}$ material and nonlinearly coupling the photon wave packet from the first resonant mode to the second resonant mode comprises applying the at least one classical control field at a frequency equal to a frequency difference between the first resonance frequency and the second resonance frequency.

5. The method of claim 1, wherein nonlinearly coupling the photon wave packet from the first resonant mode to the second resonant mode occurs via three-wave mixing.

6. The method of claim 1, wherein the nonlinear optical material comprises a $\chi^{(3)}$ material, the at least one classical control field comprises a first optical control field at a first frequency and a second optical control field at a second frequency, nonlinearly coupling the photon wave packet from the first resonant mode to the second resonant mode comprises coupling the first optical control field and the second optical control field into the optical resonator, and a frequency difference between the first frequency and the second frequency equals a frequency difference between the first resonance frequency and the second resonance frequency.

7. The method of claim 1, wherein nonlinearly coupling the photon wave packet from the first resonant mode to the second resonant mode occurs via four-wave mixing.

8. The method of claim 1, wherein applying the 0 phase shift to the photon wave packet if the photon wave packet includes one photon or the $\pi$ phase shift to the photon wave packet if the photon wave packet includes two photons comprises generating a second harmonic of the photon wave packet in the second resonant mode.

9. The method of claim 1, wherein applying the 0 phase shift to the photon wave packet if the photon wave packet includes one photon or the $\pi$ phase shift to the photon wave packet if the photon wave packet includes two photons occurs via self-phase-modulation of the photon wave packet in the second resonant mode.

10. The method of claim 1, wherein applying the 0 phase shift to the photon wave packet if the photon wave packet includes one photon or the $\pi$ phase shift to the photon wave packet if the photon wave packet includes two photons comprises:
    nonlinearly coupling the photon wave packet from the second resonant mode to a third resonant mode of the optical resonator that is resonant with a two-level emitter; and
    absorbing and emitting the photon wave packet by the two-level emitter.

11. The method of claim 1, wherein applying the 0 phase shift to the photon wave packet if the photon wave packet includes one photon or the $\pi$ phase shift to the photon wave packet if the photon wave packet includes two photons comprises:
    nonlinearly coupling the photon wave packet from the second resonant mode to a third resonant mode of the optical resonator in response to a control field; and
    nonlinearly coupling the photon wave packet from the third resonant mode to a fourth resonant mode via second-harmonic generation.

12. A two-photon logic gate comprising:
    a first optical waveguide;
    a first nonlinear optical resonator evanescently coupled to the first optical waveguide and having a first coupled resonant mode coupled to the first optical waveguide and a first de-coupled resonant mode de-coupled from the first optical waveguide, wherein a resonant frequency of the first coupled resonant mode is different than a resonant frequency of the first de-coupled resonant mode;
    a second optical waveguide;

a second nonlinear optical resonator evanescently coupled to the second optical waveguide and having a second coupled resonant mode coupled to the second optical waveguide and a second de-coupled resonant mode de-coupled from the second optical waveguide, wherein a resonant frequency of the second coupled resonant mode is different than a resonant frequency of the second de-coupled resonant mode; and a beam splitter, having a first output coupled to the first optical waveguide and a second output coupled to the second optical waveguide, to couple a two-photon state into the first nonlinear optical resonator via the first optical waveguide or into the second nonlinear optical resonator via the second optical waveguide.

13. The two-photon logic gate of claim 12, wherein the first nonlinear optical resonator comprises a first resonator having a first free spectral range (FSR) and a second resonator, optically coupled to the first resonator, having a second FSR equal to an integer multiple of the first FSR.

14. The two-photon logic gate of claim 13, wherein the first resonator is a first ring resonator having a first diameter and the second resonator is a second ring resonator evanescently coupled to the first ring resonator and having a second diameter different than the first diameter.

15. The two-photon logic gate of claim 13, wherein the first resonator is a first Fabry-Perot cavity having a first optical path length and the second resonator is a second Fabry-Perot cavity having a second optical path length different than the first optical path length.

16. The two-photon logic gate of claim 12, wherein the first nonlinear optical resonator is configured to apply a phase shift of $\pi$ to a photon wave packet with two photons.

17. The two-photon logic gate of claim 16, wherein the first nonlinear optical resonator is configured to apply the phase shift to the photon wave packet via self-phase-modulation of photons in the first de-coupled resonant mode.

18. The two-photon logic gate of claim 16, wherein the first nonlinear optical resonator is configured to apply the phase shift to the photon wave packet via second harmonic generation of photons in the first de-coupled resonant mode.

19. The two-photon logic gate of claim 16, wherein the first nonlinear optical resonator comprises a two-level emitter configured to absorb and re-emit photons propagating in a resonant mode of the first nonlinear optical resonator.

20. The two-photon logic gate of claim 12, further comprising:
a third optical waveguide; and
a third nonlinear optical resonator evanescently coupled to the third optical waveguide and having a third coupled resonant mode coupled to the third optical waveguide and a third de-coupled resonant mode de-coupled from the third optical waveguide.

21. A quantum information processor comprising the two-photon logic gate of claim 12.

22. The quantum information processor of claim 21, further comprising:
a network of Mach-Zehnder interferometers coupled to the two-photon logic gate.

* * * * *